US009762015B2

(12) United States Patent
Steinbach et al.

(10) Patent No.: US 9,762,015 B2
(45) Date of Patent: Sep. 12, 2017

(54) BRUSH HOLDER APPARATUS AND SYSTEM

(71) Applicant: General Electric Company, Schenectady, NY (US)

(72) Inventors: Albert Eugene Steinbach, Rotterdam, NY (US); Eric Steven Buskirk, Scotia, NY (US); Benjamin Alber Mancuso, Glenville, NY (US); Frank Austin Scalzo, III, New Hartford, NY (US); Curtis Maurice Hebert, Guilderland, NY (US); Matthew Thomas Preston, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 559 days.

(21) Appl. No.: 14/300,319

(22) Filed: Jun. 10, 2014

(65) Prior Publication Data
US 2015/0357780 A1 Dec. 10, 2015

(51) Int. Cl.
*H01R 39/38* (2006.01)
*H01R 39/58* (2006.01)
*H01R 43/14* (2006.01)
*H02K 13/00* (2006.01)
*H02K 5/14* (2006.01)

(52) U.S. Cl.
CPC .......... *H01R 39/58* (2013.01); *H01R 39/385* (2013.01); *H01R 43/14* (2013.01); *H02K 5/148* (2013.01); *H02K 13/00* (2013.01); *H02K 2205/06* (2013.01)

(58) Field of Classification Search
CPC ...... H01R 39/385; H01R 39/58; H01R 43/14; H02K 5/148; H02K 13/00
USPC ....... 310/219, 220, 239, 240, 241, 242, 244, 310/245, 246, 248, 68 B
See application file for complete search history.

(56) References Cited

U.S. PATENT DOCUMENTS

| 2,578,436 A | 12/1951 | Lundy |
| 3,387,155 A | 6/1968 | Krulls |
| 3,432,708 A | 3/1969 | Bissett |
| 3,654,504 A | 4/1972 | Susdorf et al. |

(Continued)

FOREIGN PATENT DOCUMENTS

CN 201130804 Y 10/2008

*Primary Examiner* — Bernard Rojas
*Assistant Examiner* — Ahmed Elnakib
(74) *Attorney, Agent, or Firm* — James W. Pemrick; Ernest G. Cusick; Frank A. Landgraff

(57) ABSTRACT

A brush holder system includes a stationary support member having at least one groove, and a fork electrical connector. A brush retainment member is configured to be releasably affixed to the stationary support member. The brush retainment member has at least one rail configured to slide along the at least one groove. The brush retainment member has a knife electrical connector configured to mate with the fork electrical connector. A radio frequency identification device (RFID) tag is mounted on the brush retainment member, and the RFID tag is configured to monitor brush wear and communicate brush wear status to a monitoring system. The stationary support member is configured for electrical connection to a collector mount and the brush retainment member is configured to retain at least one brush.

19 Claims, 12 Drawing Sheets

(56) References Cited

U.S. PATENT DOCUMENTS

| | | | |
|---|---|---|---|
| 3,864,803 A * | 2/1975 | Ohmstedt | H01R 39/383 29/732 |
| 3,968,391 A | 7/1976 | Blank | |
| 4,296,346 A * | 10/1981 | Ooki | H01R 39/42 310/240 |
| 4,329,611 A * | 5/1982 | Ohmstedt | H01R 39/42 310/227 |
| 4,447,797 A * | 5/1984 | Saunders | H01B 3/40 174/110 E |
| 4,580,333 A | 4/1986 | Griffis | |
| 4,663,552 A | 5/1987 | Ohmstedt | |
| 4,739,208 A | 4/1988 | Kimberlin | |
| 5,043,619 A | 8/1991 | Kartman, Jr. | |
| 7,122,935 B2 | 10/2006 | Custforth et al. | |
| 7,141,906 B2 | 11/2006 | Custforth et al. | |
| 7,218,028 B2 | 5/2007 | Annis et al. | |
| 7,365,470 B1 * | 4/2008 | Eger | H01R 39/40 310/239 |
| 7,417,354 B2 | 8/2008 | Cutsforth et al. | |
| 7,564,160 B2 | 7/2009 | Cutsforth et al. | |
| 7,608,970 B2 | 10/2009 | Eger et al. | |
| 7,990,018 B2 | 8/2011 | Cutsforth et al. | |
| 8,179,014 B2 | 5/2012 | Cutsforth et al. | |
| 8,384,266 B2 | 2/2013 | Fish et al. | |
| 8,618,713 B2 | 12/2013 | Kuban et al. | |
| 2005/0122227 A1 | 6/2005 | Itou et al. | |
| 2005/0156478 A1 * | 7/2005 | Berghanel | H01R 39/40 310/242 |
| 2008/0101895 A1 * | 5/2008 | Holcomb | B25J 15/0226 414/226.02 |
| 2008/0291040 A1 * | 11/2008 | Cutsforth | G05B 23/0232 340/653 |
| 2009/0153089 A1 * | 6/2009 | Hobelsberger | H01R 39/58 318/490 |
| 2009/0267782 A1 * | 10/2009 | Mark | G01R 31/343 340/648 |
| 2011/0163628 A1 * | 7/2011 | Quail | H01R 43/14 310/240 |
| 2012/0206010 A1 * | 8/2012 | Kuban | H01R 39/40 310/242 |
| 2012/0217841 A1 | 8/2012 | Cutsforth et al. | |
| 2012/0248929 A1 * | 10/2012 | Fish | H01R 39/58 310/248 |
| 2013/0249355 A1 | 9/2013 | Fish et al. | |
| 2014/0045349 A1 | 2/2014 | Kuban et al. | |

* cited by examiner

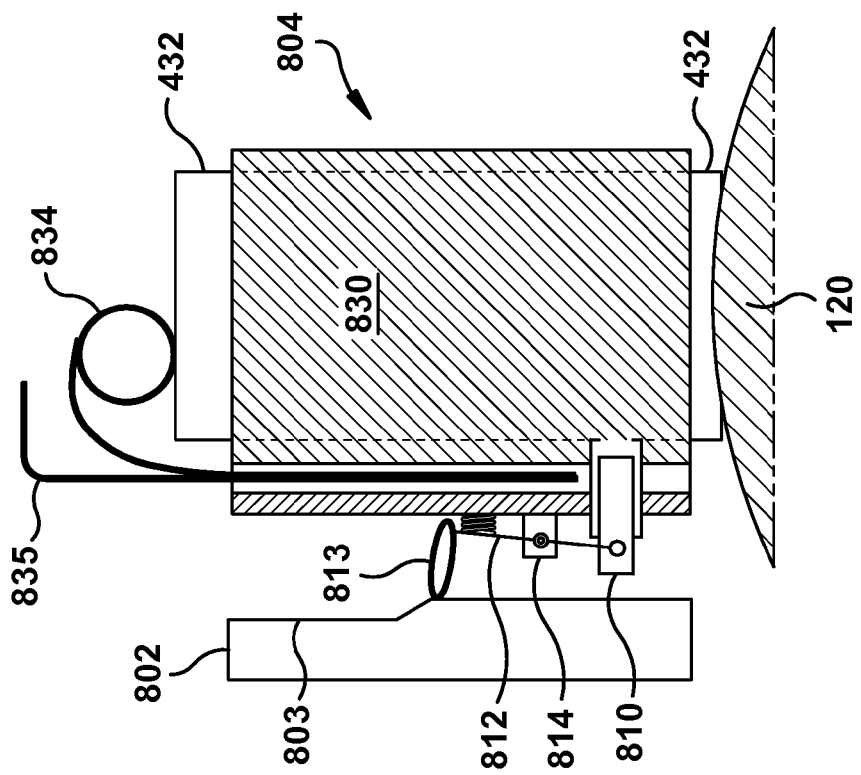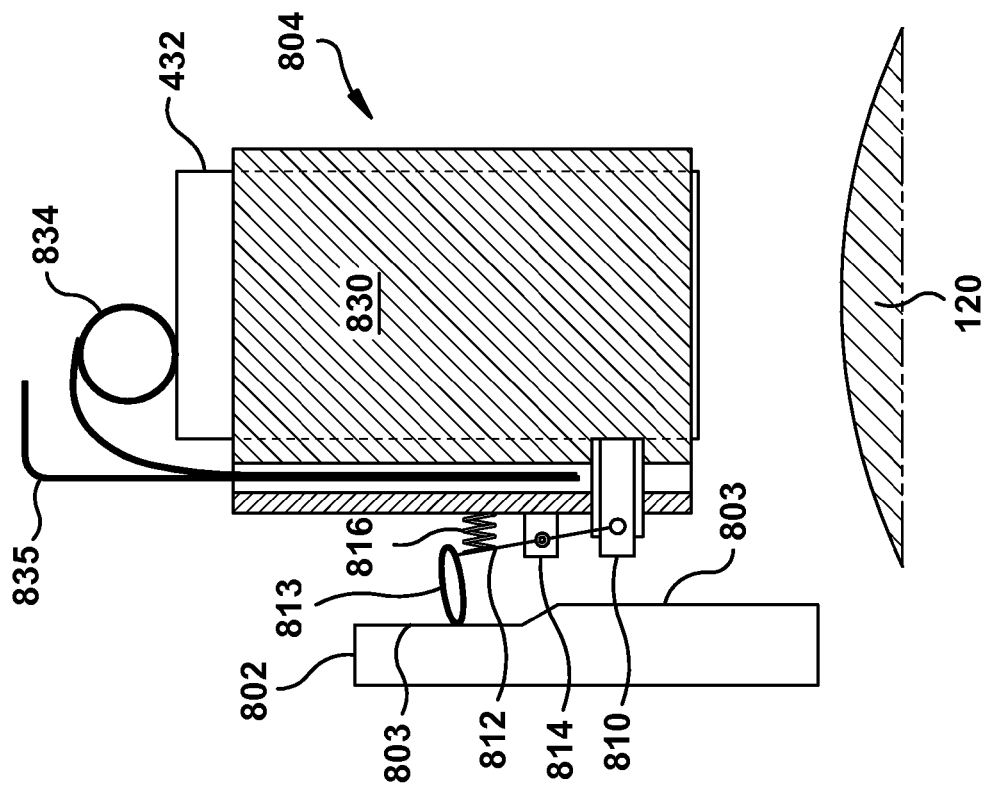

BRUSH HOLDER APPARATUS AND SYSTEM

BACKGROUND OF THE INVENTION

The subject matter disclosed herein relates to a brush holder apparatus and system. Specifically, the subject matter disclosed herein relates to a brush holder apparatus and system configured to conduct electrical current between a brush and a rotating element of a dynamoelectric machine (e.g., an electrical generator, electrical motor, etc.) and/or another rotating machine (e.g., a rotating crane).

Conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

BRIEF DESCRIPTION OF THE INVENTION

According to an aspect of the invention, a brush holder system includes a stationary support member having at least one groove, and a fork electrical connector. A brush retainment member is configured to be releasably affixed to the stationary support member. The brush retainment member has at least one rail configured to slide along the at least one groove. The brush retainment member has a knife electrical connector configured to mate with the fork electrical connector. A radio frequency identification device (RFID) tag is mounted on the brush retainment member, and the RFID tag is configured to monitor brush wear and communicate brush wear status to a monitoring system. The stationary support member is configured for electrical connection to a collector mount and the brush retainment member is configured to retain at least one brush.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 8 illustrates a schematic view of a plunger brush restraint that may be used with the brush holder, according to an aspect of the present invention.

FIG. 9 illustrates a schematic view of a plunger brush restraint that may be used with the brush holder, according to an aspect of the present invention.

Figure 1:
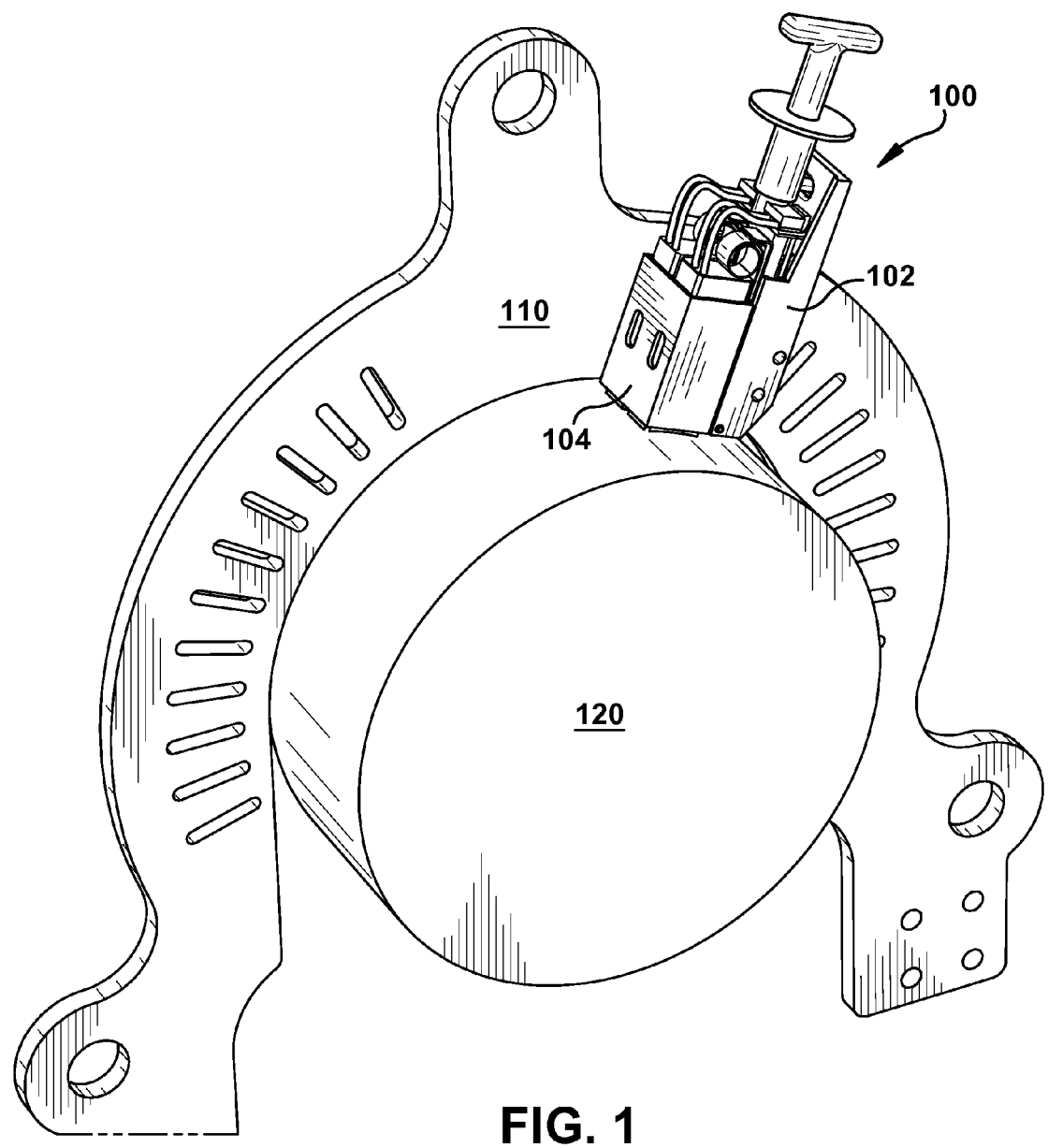
FIG. 1 illustrates a partial perspective view of a single brush holder installed on a collector horseshoe, according to an aspect of the present invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention provide for a brush holder assembly (or apparatus) configured to conduct electrical current between a brush and a rotating element of a dynamoelectric machine (e.g., an electrical generator, electrical motor, etc.) and/or another rotating machine (e.g., a rotating crane). In particular, aspects of the invention provide for a brush holder assembly that may aid an operator in safely removing/replacing brushes in a dynamoelectric machine and/or another rotating machine.

As described herein, conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

In contrast to conventional brush holders, aspects of the invention include a brush holder apparatus for a dynamoelectric machine including a rotating cam brush retainer.

This cam-style brush retainer may allow for efficient and safe installation and/or removal of brushes from dynamo-electric machines.

FIG. 1 illustrates a partial perspective view of a single brush holder installed on a collector horseshoe, according to an aspect of the present invention. A brush mount or collector horseshoe 110 is mounted over a collector ring 120. The collector ring rotates along with the rotor (not shown). A plurality of brushes and corresponding brush holders are attached to the collector horseshoe and are distributed at least partially around the collector ring. In this example, only a single brush holder apparatus 100 is shown attached to the collector horseshoe 110. The brush holder apparatus 100 may be bolted or screwed to the collector horseshoe, or any other suitable method may be employed. The brush holder apparatus 100 includes a stationary support member 102 and a brush retainment member 104. The stationary support member 102 is configured for electrical connection to the collector mount (i.e., collector horseshoe 110), for example, by being fabricated of a conductive material or including a conductive material. The brush retainment member 104 is configured to retain the brush (contained therein) at least in the axial and circumferential directions.

Figure 2:
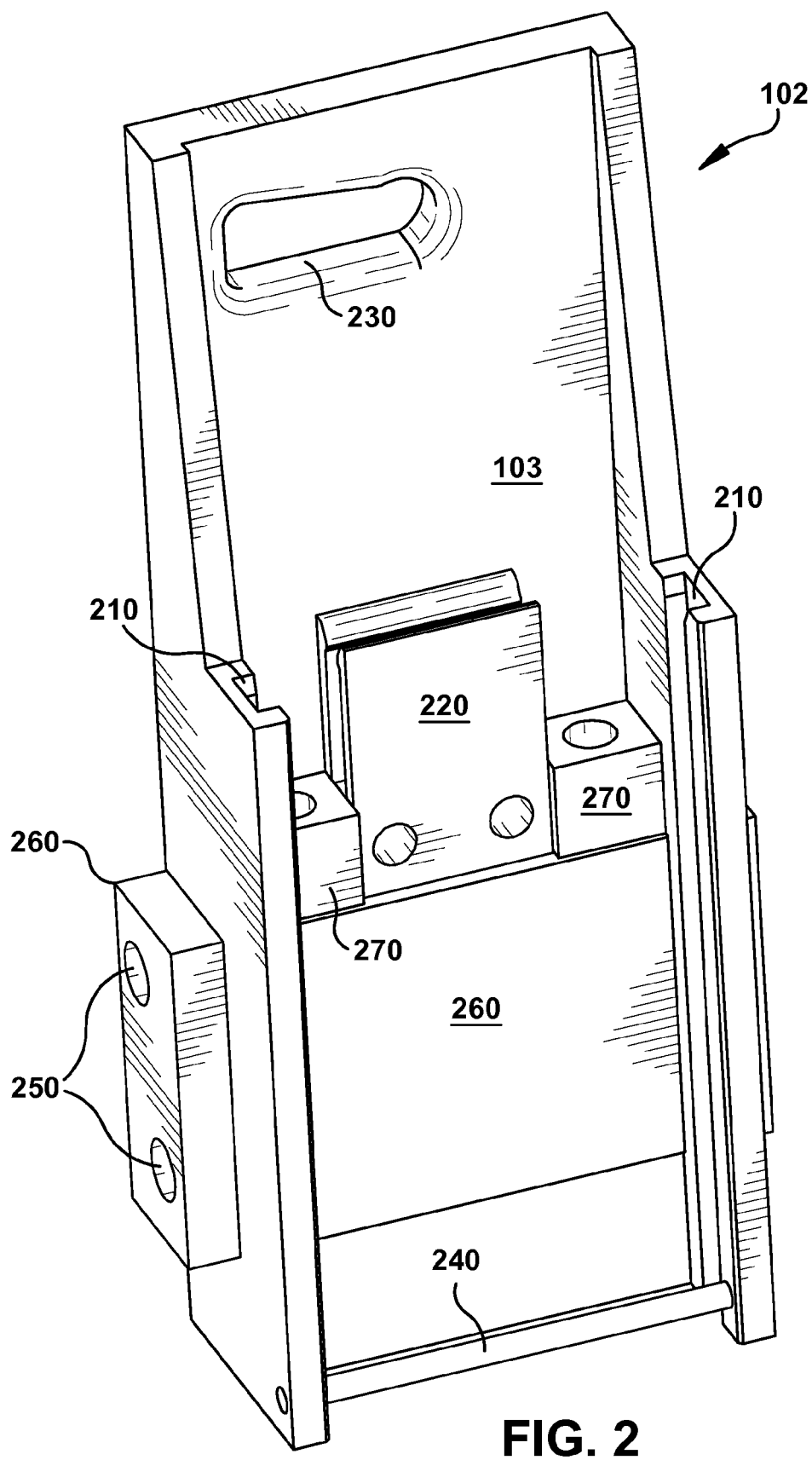
FIG. 2 illustrates a perspective view of the stationary support member, according to an aspect of the present invention.

FIG. 2 illustrates a perspective view of the stationary support member 102, according to an aspect of the present invention. The stationary support member 102 includes at least one groove 210 (two are shown in FIG. 2) and a fork electrical connector 220. The fork electrical connector 220 may extend to one or both sides of the stationary support member, or alternatively the fork electrical connector may only be centrally located without extending to the sides of the stationary support member. A tapered slot 230 is located in an upper portion of the stationary support member 102, and the slot 230 is configured for cooperation with a locking pin 450 on the brush retainment member. The locking pin could also be replaced by a bar or latch or protrusion or disc with a ramped surface. The tapered nature of slot 230 acts to force the brush retainment member down into the connector 220 as the locking pin 450 is rotated. A bar 240 may be located near a bottom end of the stationary support member 102, and this bar is configured to engage and restrain a cam on the brush retainment member 104. The bar 240 also serves to limit the distance the brush retainment member 104 can be inserted into the stationary support member 102. The brush retainment member 104 is fixed in position relative to the stationary support member 102 between the locking pin 450 at top and the bar 240 at the bottom. The bar 240 is fully contained within the profile of the stationary support member 102 and does not protrude past that profile. A plurality of holes 250 are provided and are configured to facilitate attachment of the stationary support member 102 to the collector mount (or collector horseshoe 110). The holes 250 may be internally threaded for use with mechanical fasteners, such as bolts or screws. In addition, the holes 250 may be provided on both sides of the stationary support member 102 so that they are configured to attach a plurality of stationary support members together in a stacked or side-by-side arrangement. This may be desired when multiple brushes are stacked side-by-side. For example, 3, 4, 5, 6, 7 or more brushes may be arranged at one circumferential location on collector horseshoe 110. A conductive spacer plate (or bar) 260 may be located on one or more sides of the stationary support member 102. The conductive spacer plate/bar 260 is configured to provide electrical conductivity with the collector mount (collector horseshoe 110) and/or a second stationary support member (e.g., connected to the side of the first stationary support member).

Figure 3:
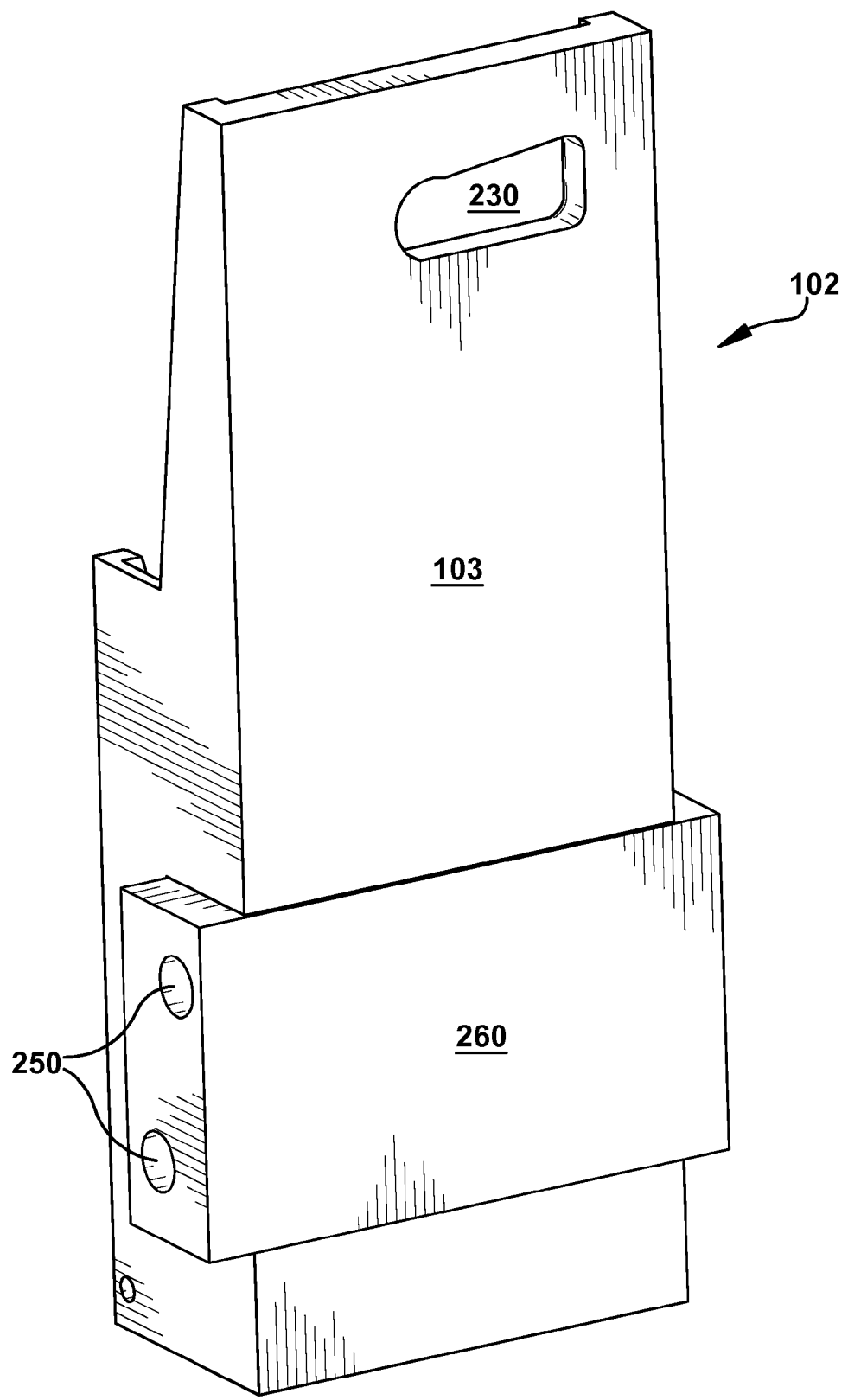
FIG. 3 illustrates a perspective rear view of the stationary support member 102 as shown in FIG. 2, according to an aspect of the present invention.

FIG. 3 illustrates a perspective rear view of the stationary support member 102 as shown in FIG. 2, according to an aspect of the present invention. The conductive bar 260 passes through a portion of the stationary support member's main body 103, and is configured to provide electrical conductivity with the collector mount 110 and the fork electrical connector 220. This arrangement enables the stationary support 102 to be fully electrically insulated and the current to pass from the horseshoe 110 to the fork 220 through the conductive bar 260. The holes 250 to mount to the horseshoe 110 are formed in conductive bar 260. In alternative embodiments, the conductive bar 260 may be lengthened so that multiple stationary supports 102 could be attached to the same (longer) conductive bar 260. The conductive bar 260 may be attached to the stationary support 102 and the fork 220 via bolts that run up through the bottom of the stationary support through the conductive bar 260 and into either the electrical fork 220 and/or one or more tabs/bosses 270. In this example, one tab/boss 270 is shown on each side of the electrical fork 220. The fork electrical connector 220 may also be formed integrally with the conductive bar 260.

The stationary support member 102 may be configured to accept one, two (as shown), three, or more brush retainment members. A preferred version would be a stationary support member that accepts one or two brushes, and multiple stationary support members and can be arranged side-by-side for applications needing a specific number of brushes at a given circumferential location on the collector horseshoe. The stationary support member 102 and/or the brush retainment member may be formed substantially (or comprised) of aluminum, an aluminum alloy, stainless steel or any other suitable electrically conductive or electrically non-conductive material as desired in the specific application. As one non-limiting example only, the stationary support member 102 and the brush retainment member 104 may be formed substantially (or comprised) of a passivated or anodized aluminum, or a passivated or anodized aluminum alloy. This material will give good strength while providing an electrically insulating or electrically semi-insulating material. It is desired to minimize current flow through the brush holder body and focus the current flow through the brushes and electrical path of the brush holder designed for this current flow. In addition, it would be desirable to minimize (or even block) any current flow to portions that may be grasped by a technician during insertion or removal. Also, it is desirable to avoid the possibility of current arcing directly from the collector ring 120 to the brush retainment member 104 or to the stationary support member 102 when a brush 432 is worn out and no longer able to be part of the path for the current. At least a portion of a surface of at least one of the stationary support member and the brush retainment member is configured to be substantially electrically insulating. For example, the handle of the brush retainment member should be substantially electrically insulating to protect a technician during insertion or removal of the brush holder on an operating machine. Alternatively, the stationary support member and the brush retainment member may be formed substantially (or comprised) of a powder coated or painted aluminum or a powder coated or painted aluminum alloy or a powder coated metallic or non-metallic material or a ceramic coated metallic or ceramic coated non-metallic material.

Figure 4:
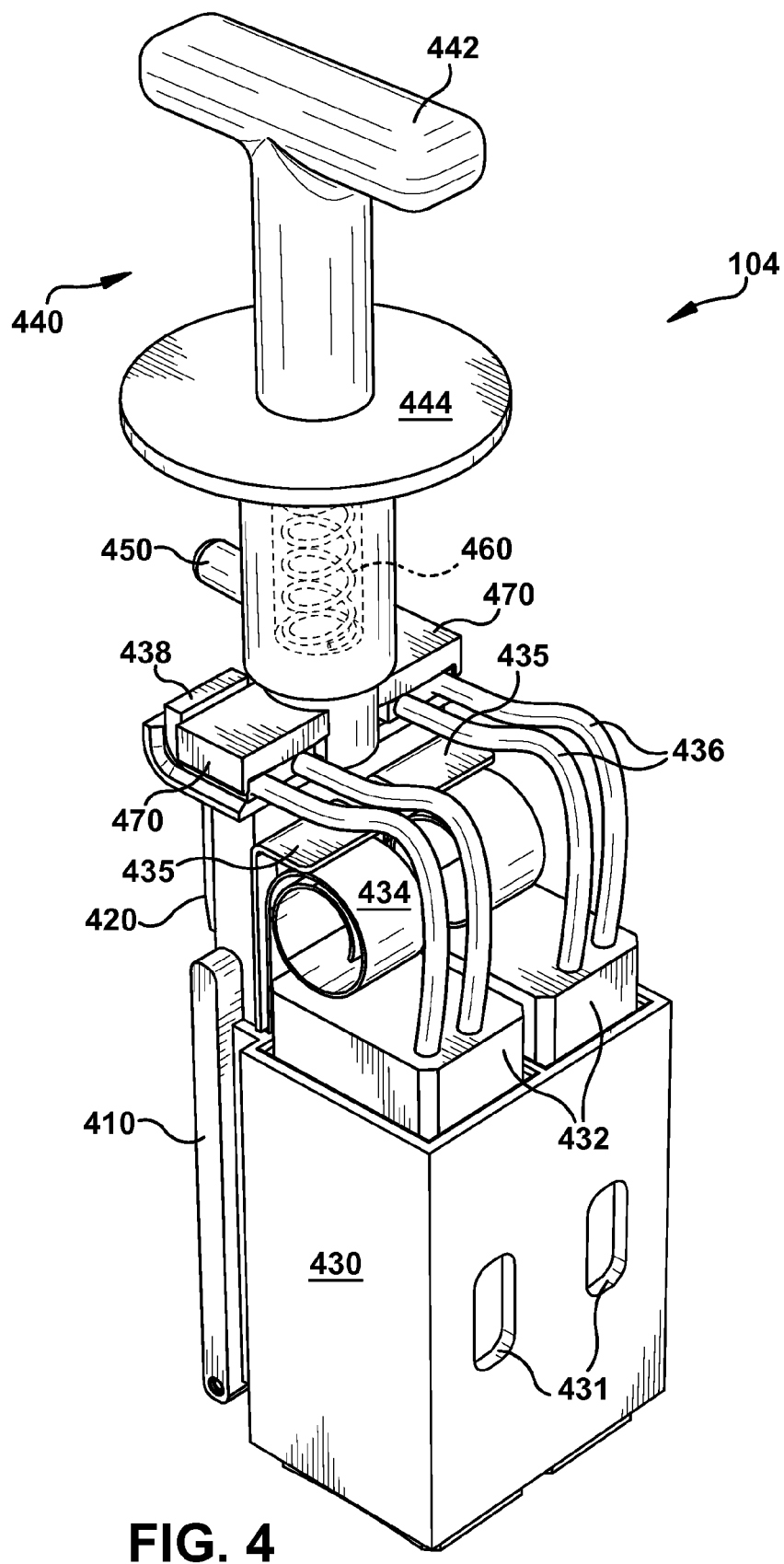
FIG. 4 illustrates a perspective front view of the brush retainment member, according to an aspect of the present invention.
Figure 5:
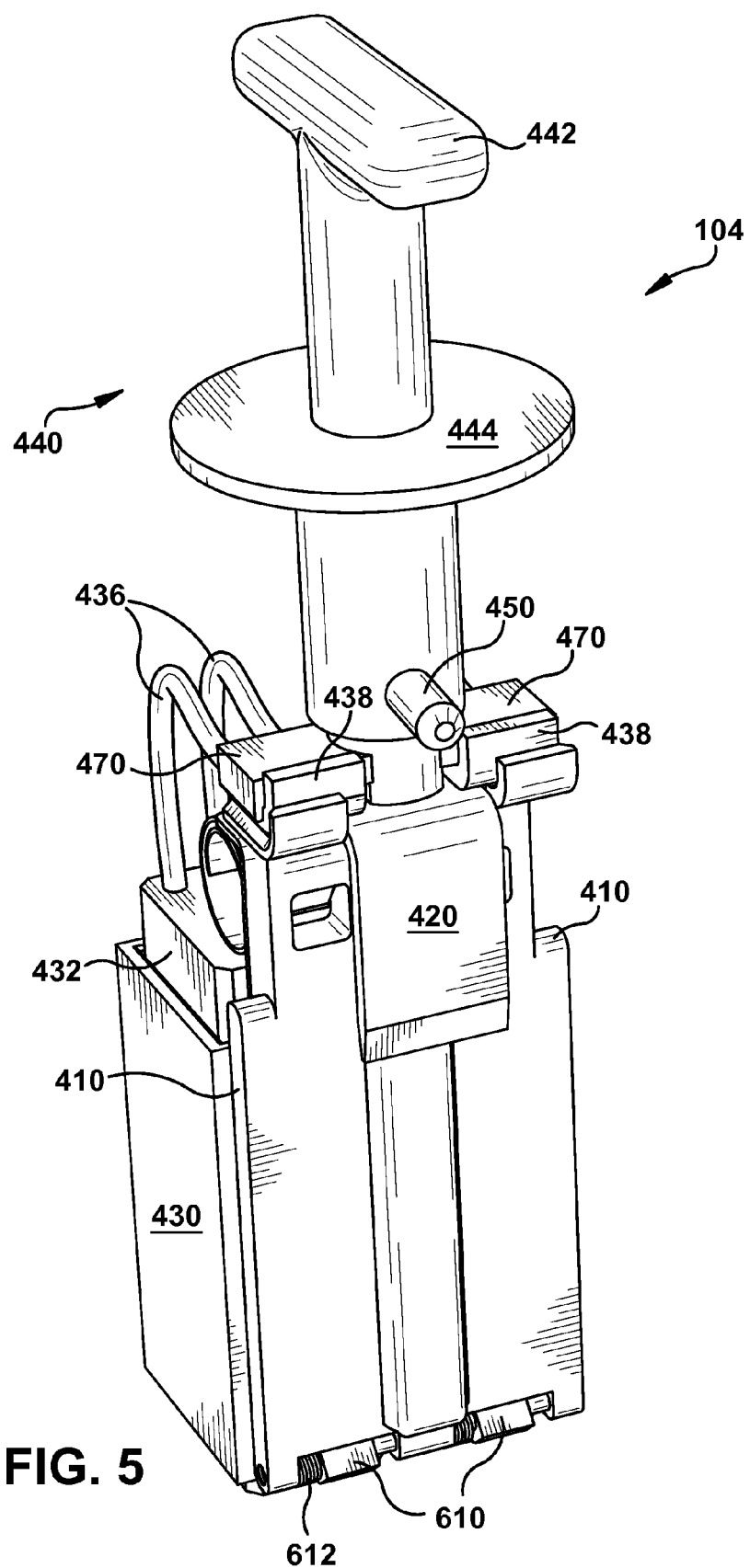
FIG. 5 illustrates a perspective rear view of the brush retainment member, according to an aspect of the present invention.

FIG. 4 illustrates a perspective front view of the brush retainment member 104, according to an aspect of the present invention. FIG. 5 illustrates a perspective rear view of the brush retainment member 104, according to an aspect of the present invention. The brush retainment member 104 is configured to be releasably affixed to the stationary support member 102. At least one rail 410 is configured to slide along groove 210. In the example shown the brush retainment member 104 includes two rails 410, one on each side of the brush retainment member. A knife electrical connector 420, configured to mate with the fork electrical connector 220, is located on the rear of the brush retainment member 104. A brush retaining box 430 retains one or more brushes 432 in the axial and circumferential directions. In the example shown, box 430 retains two brushes 432. The brushes 432 are biased radially downward by brush springs 434. Apertures 431 form windows in the box 430 and allow the brushes 432 to be seen and visually monitored for wear.

The brush retainment member 104 includes a handle assembly 440 that includes an electrically insulating handle 442 and an electrically insulating guard 444 or shield that is located between the handle 442 and the brush connector leads 436. The brush connector leads 436 carry high voltage and current while the dynamoelectric machine is operating, so these present a hazard to be avoided. The electrically insulating handle 442 and guard 444 will prevent a technician's hand from coming into contact with the energized brush connector leads 436. The handle 442 and guard 444 may be comprised of plastic, rubber, epoxy/fiberglass laminate, fiberglass, or any other suitable electrically insulating material.

The locking pin 450 is configured for cooperation with the tapered slot 230 in the stationary support member 102. The handle assembly can rotate, and as it rotates the locking pin 450 can be rotated into, or out of, the tapered slot 230. The views of FIGS. 4 and 5 show the locking pin 450 and handle 442 oriented in the locked position. In this locked position the locking pin 450 is fully inserted into the slot 230 and the tapered surface drives the locking pin radially downward. In other words, the handle assembly 440 is configured to be rotated about 90 degrees, a 0 degree position configured so that the locking pin 450 is disengaged from the tapered slot 230 so that the brush retainment member 104 may be removed from the stationary support member 102. A 90 degree position (as shown in FIGS. 4 and 5) is configured so that the locking pin 450 is engaged in the tapered slot 230 so that the brush retainment member 104 is fully locked into operating condition on the stationary support member 102. By having the handle 442 oriented parallel to the locking pin 450 and having the locking pin 450 extend through the tapered slot 230, the operator can easily see that the brush retainment member 104 is fully inserted and locked in place within the stationary support 102.

A spring assembly 460 is housed within the handle assembly 440, and the spring assembly is mechanically connected to the brush terminal compression plate 470 (two of which are shown). The brush terminal compression plate may be one piece that extends through the shaft of the handle, but it could also be fabricated from two pieces. The brushes 432 are connected to the brush terminals 438 via brush connector leads (or pigtails) 436. The brush terminals 438 are electrically connected to the knife electrical connector 420. For example, the knife electrical connector includes an electrically conductive base member that extends under each brush terminal 438, thereby making an electrically conductive path. The spring assembly 460 biases the compression plates 470 downward and this downward pressure retains the brush terminals in place and against the base member of the knife electrical connector 420. This is particularly advantageous when the brush retainment member 104 is being inserted (or removed from) the stationary support member 102. It is advised to use only one hand when manually inserting or removing the brushes, and the spring assembly ensures that a second hand is not required to keep the brush terminals 438 in place. Once the brush retainment member 104 is fully inserted into the stationary support member, the handle 442 is rotated 90 degrees (into a locked position) and the tapered slot 230 forces the locking pin 450 (as well as brush retainment member 104) radially downward applying additional force onto the brush terminals 438. An advantage of this design is that the brush retainment member 104 is configured to clamp a brush terminal 438 between a terminal compression plate 470 and an opposing surface of the brush retainment member (i.e., the electrically conductive base member of knife electrical connector 420), so that the brush terminal is engaged or released without the use of any tools. All that is required is manual placement of the respective parts by hand. Minimizing or eliminating the use of specific tools can greatly simplify and increase the safety of working around dynamoelectric machines, especially when they are operating and energized.

As illustrated, the brush box 430 is configured to hold two brushes 432. However, the box 430 can be configured to hold one brush 432 (by reducing the width of the box) or three or more brushes (by increasing the width of the box and providing additional individual brush apertures). The brush terminal 438 includes an upward bend located at a distal end thereof. This bend helps to keep the brush terminal in place under the compression plate 470. The bend could also be replaced by a rib or a rail. A hole or notch could also be provided in the brush terminal that cooperates with a complementary feature on the terminal compression plate 470 or the electrically conductive base member of knife electrical connector 420. For example, if the brush terminal 438 included a hole in the center thereof, the compression plate 470 could have a complementary pin located to engage the hole of the brush terminal. This complementary feature on the brush retainment member facilitates securing the brush terminal to the brush retainment member. The inverse could also be used, with the brush terminal having a complementary pin and the compression plate having the hole. With this arrangement, the brush retainment member 104 is configured to electrically and mechanically connect the knife electrical connector 220 to the brush terminal 438, while both the knife electrical connector 220 and the brush terminal 438 are electrically insulated from handle 442.

As the brush 432 wears down due to frictional contact with the rotor collector ring 120, the brush spring 434 will keep the eroding surface of the brush 432 in contact with the rotor collector ring 120. The brush spring 434 is configured to press the brush 432 radially downward and against the collector ring 120, because the spring 434 is designed with tension to re-coil itself. In this manner, the coil at the top of the spring 434 wants to re-tighten or coil downward, thereby applying a radially downward force to brush 432. The brush spring 434 includes a bent support plate 435 immediately behind and above the coiled spring 434. The spring 434 may be riveted to the bottom of the bent support plate 435. The bent support plate 435 may also include an angled tab configured for insertion into a complementary recess in the brush retainment member 104. The brush spring 434 and bent support plate 435 are flexible to allow the angled tab to be moved into the complementary recess for insertion of the brush spring, and out of the complementary recess for removal of the brush spring. The brush spring 434 and bent support plate 435 are also configured to be located in-line with the cam member 610 configured for restraining the brush 432 against the brush retainment member or box 430.

This in-line arrangement is aligned so that any potential binding is reduced or eliminated and smooth operation is permitted between the spring 434, brush 432 and cam members 610.

Figure 6:
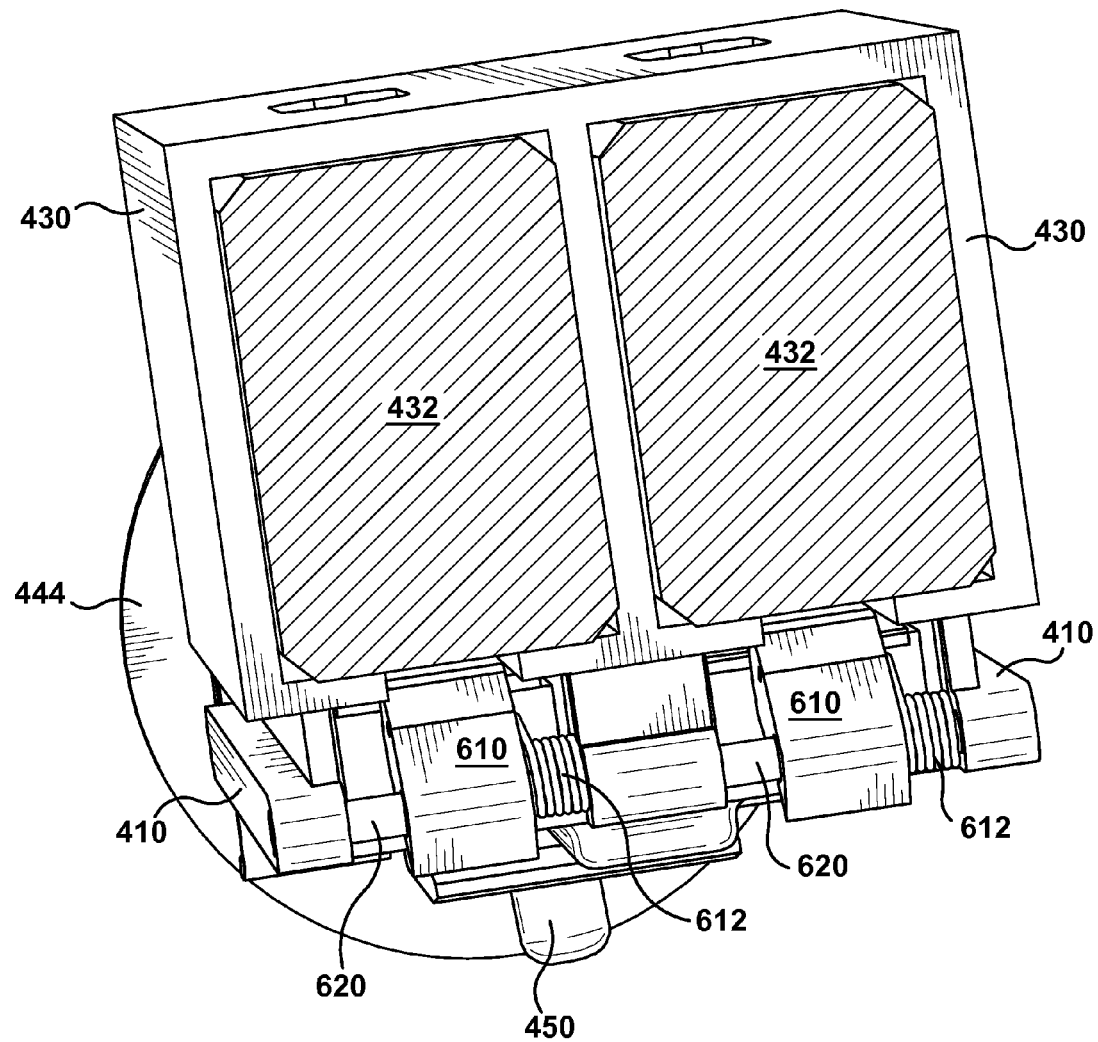
FIG. 6 illustrates a bottom view of the brush retainment member and the cam members used to retain the brushes, according to an aspect of the present invention.

FIG. 6 illustrates a bottom view of the brush retainment member 104 and the cam members 610 used to retain the brushes 432, according to an aspect of the present invention. A cam member 610 is operably connected to the shaft 620 near a bottom of the brush retainment member 104. The cam member 610 is configured to retain the brush 432 against the brush retainment member or box 430 until the brush retainment member 104 is fully inserted in the stationary support member 102. The cam member 610 is constant-angle cam shaped and is mounted with a spring 612 (e.g., a torsional spring) to shaft 620. The constant-angle cam shape is consistent with logarithmic spiral geometry. That means that no matter how much the cam member 610 is rotated in order to reach the brush 432 surface, the cam 610 will contact the brush 432 with the same angle and same large force to resist sliding of the brush within the brush retainment member 104. Not all brushes may be exactly the same size so it is important that each cam member 610 is free to independently rotate on the shaft 620 to the fill the actual gap between the shaft 620 and the corresponding brush 432 surface.

Figure 13:
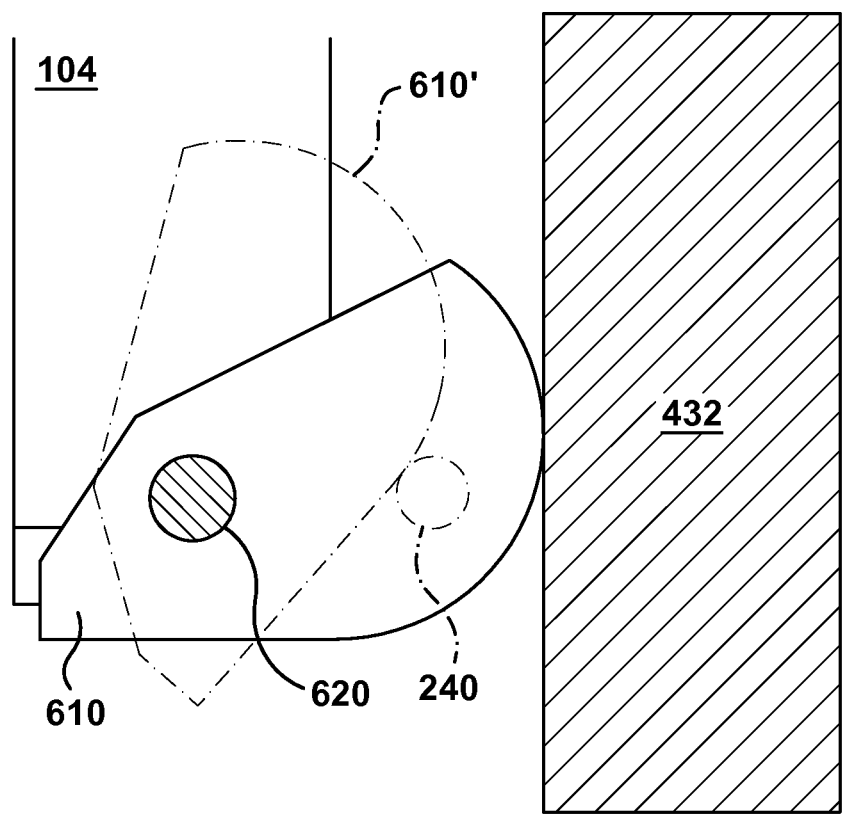
FIG. 13 illustrates a simplified side view of the cam in two positions, according to an aspect of the present invention.

FIG. 13 illustrates a simplified side view of the cam 610 in two positions, according to an aspect of the present invention. When the brush retainment member 104 is not fully inserted into the stationary support 102, the cam 610 will be rotated downward and into contact with brush 432. Once the brush retainment member 104 is fully inserted into stationary support 102, the cam 610' (shown in phantom) will be pushed up and away from the brush 432 by rod 240 (shown in phantom).

The spring 612 biases the cam member 610 towards the brush 432. As the brush 432 travels radially downward, through box 430, the cam member 610 contacts the brush 432 (via a wedge action) and prevents further downward movement of the brush 432. In effect, the cam member 610 prevents the brush from just falling through the box 430. The cam member 610 and spring 612 are configured so that the cam 610 will not damage the brush 432, and that brush 432 insertion and removal can be accomplished without the use of tools (i.e., it can be done easily by hand). In use, the brushes 432 are installed in the boxes 430 and the cam members 610 hold the brushes 432 in place. The brush retainment member 104 can now be inserted into the stationary support member 102. When the cam members 610 contact bar 240 (which occurs when the brush retainment member 104 is almost fully, if not completely, inserted into stationary support member 102), the cam members are pushed upward (by bar 240) and retract from the brushes 432. This action permits the brushes 432 to then drop onto the collector ring 120. Conversely, when the brush retainment member 104 is unlocked and withdrawn from the stationary support member 102 each cam member 610 will lose contact with the bar 240 and regain contact with its brush 432. This will ensure that the brush 432 loses contact with the collector ring 120 and is withdrawn with the brush retainment member 104. Additionally, when the brush retainment member 104 is withdrawn from the stationary support 102, the cam members 610 shown and described herein may allow for installation and/or replacement of brushes 432 using a single hand (e.g., one operator's hand) without the use of additional brush change tooling. This may provide advantages, for example, safety and efficiency advantages, over the conventional systems and approaches.

Figure 7:
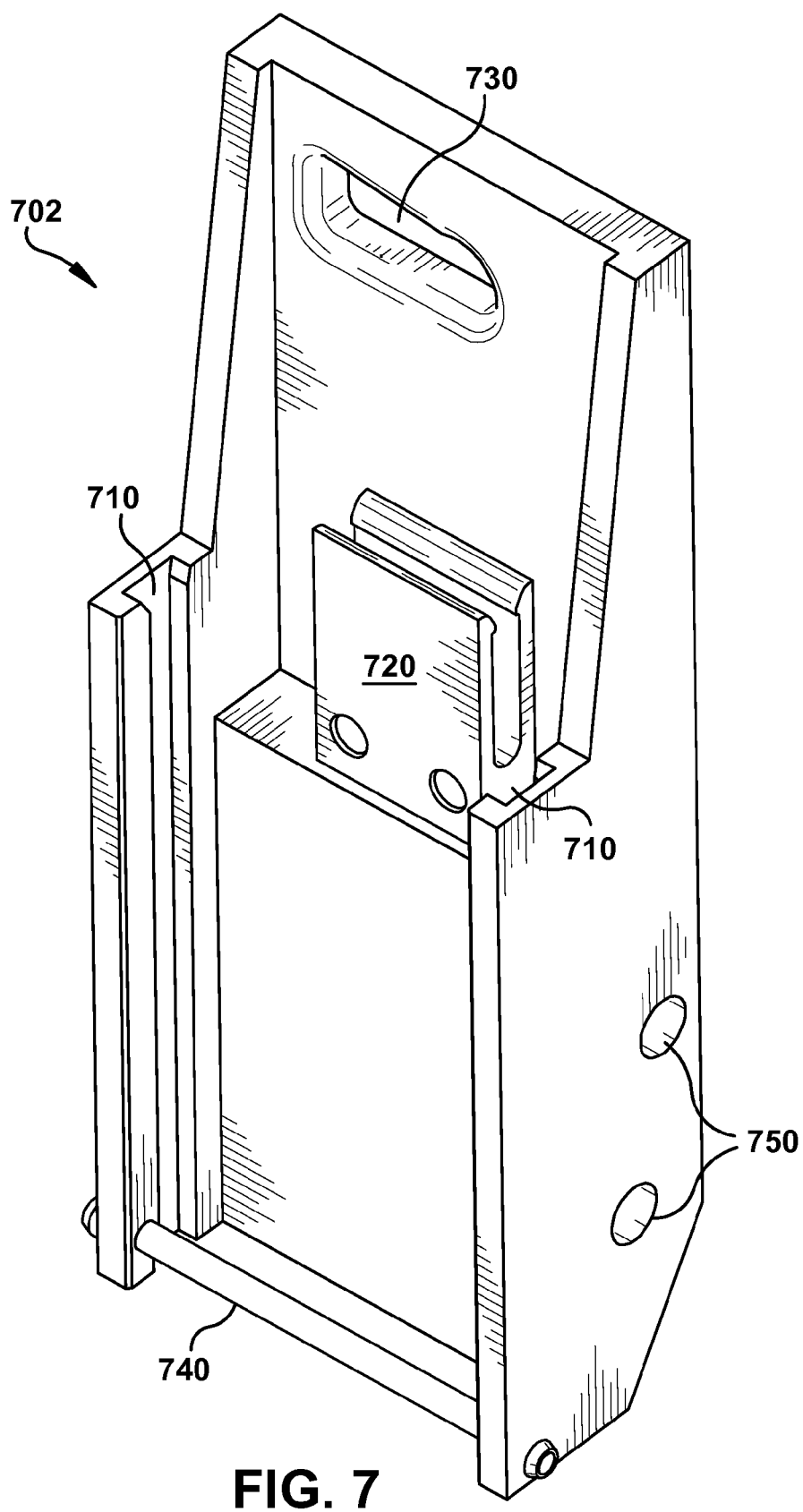
FIG. 7 illustrates a perspective view of a stationary support member, according to an aspect of the present invention.

FIG. 7 illustrates a perspective view of a stationary support member 702, according to an aspect of the present invention. The stationary support member 702 is an alternative embodiment and includes two opposing grooves 710 and a fork electrical connector 720. The fork electrical connector 720 may extend to one or both sides of the stationary support member, or alternatively the fork electrical connector may only be centrally located without extending to the sides of the stationary support member (as shown). A tapered slot 730 is located in an upper portion of the stationary support member 702, and the slot 730 is configured for cooperation with a locking pin 450 on the brush retainment member. The upper tapered surface of slot 730 acts to force the brush retainment member down into the connector 720 as the locking pin 450 is rotated into the slot. A bar 740 is located near a bottom end of the stationary support member 702, and this bar 740 is configured to engage and restrain a cam on the brush retainment member 104. A plurality of holes 750 are provided and are configured to facilitate attachment of the stationary support member 702 to the collector mount (or collector horseshoe 110). The holes 750 may be internally threaded for use with mechanical fasteners, such as bolts or screws. In addition, the holes 750 may be provided on both sides of the stationary support member 702 so that they are configured to attach a plurality of stationary support members together in a stacked or side-by-side arrangement. The fork connector 720 is electrically connected to the horseshoe 110 through the stationary support member 702.

FIGS. 8 and 9 illustrate a schematic view of a plunger brush restraint that may be used with the brush holder, according to an aspect of the present invention. FIG. 8 shows the brush 432 restrained by the plunger brush restraint and FIG. 9 shows the plunger brush restraint retracted allowing the brush 432 to drop down onto collector ring 120. FIGS. 8 and 9 illustrate an alternative way to retain the brush 432 from sliding in the holder or box 830. The stationary support is illustrated by 802 and the brush retainment member by 804. Rather than using a rotating cam 610 (see FIGS. 5-6), a plunger brush restraint apparatus having a plunger brush restraint 810 may be used to contact and restrain brush 432. FIG. 8 shows the plunger brush restraint 810 configured to restrain brush 432 by contacting the brush 432. The plunger brush restraint 810 is connected to a rotating or pivoting bar 812 and contour follower 813 through a pivot support 814. The top of the pivoting bar 812 is pivoted (or biased) away from the brush holder box (or brush retainment member) 830 by a plunger spring 816. In this manner spring 816 biases the plunger 810 against the brush 432. In FIG. 8, the spring 816 is in the extended position that corresponds with insertion and removal of the brush retainment member 804. Note that the contour follower 813 is passing a section of the contoured surface 803 of the inside wall of the stationary support 802 that is farther from the brush retainment member 804 (or brush box 830). As the brush retainment member 804 reaches its fully inserted position in stationary support 802, shown in FIG. 9, the contoured surface 803 is closer to the brush box 830 so that the contour follower 813 is forced closer to the brush box 830. This action compresses the spring 816, rotates/pivots the bar 812 about the pivot support 814 and retracts the plunger brush restraint 810. In this manner, the pivoting bar 812 and contour follower 813 are configured to follow the contoured surface 803 of the stationary support member 802. Once the plunger 810 is retracted (from brush 432), the brush 432 is allowed to slide freely inside the brush box 830 and then drop onto the collector ring 120. During insertion or removal of the brush retainment member 804, the brush 432 is restrained against brush box 830. Once the brush retainment member 804 is fully inserted into stationary support member 802, the plunger 810 is retracted and the brush is released allowing it to drop (with the aid of brush spring 834) onto collector 120.

Figure 10:
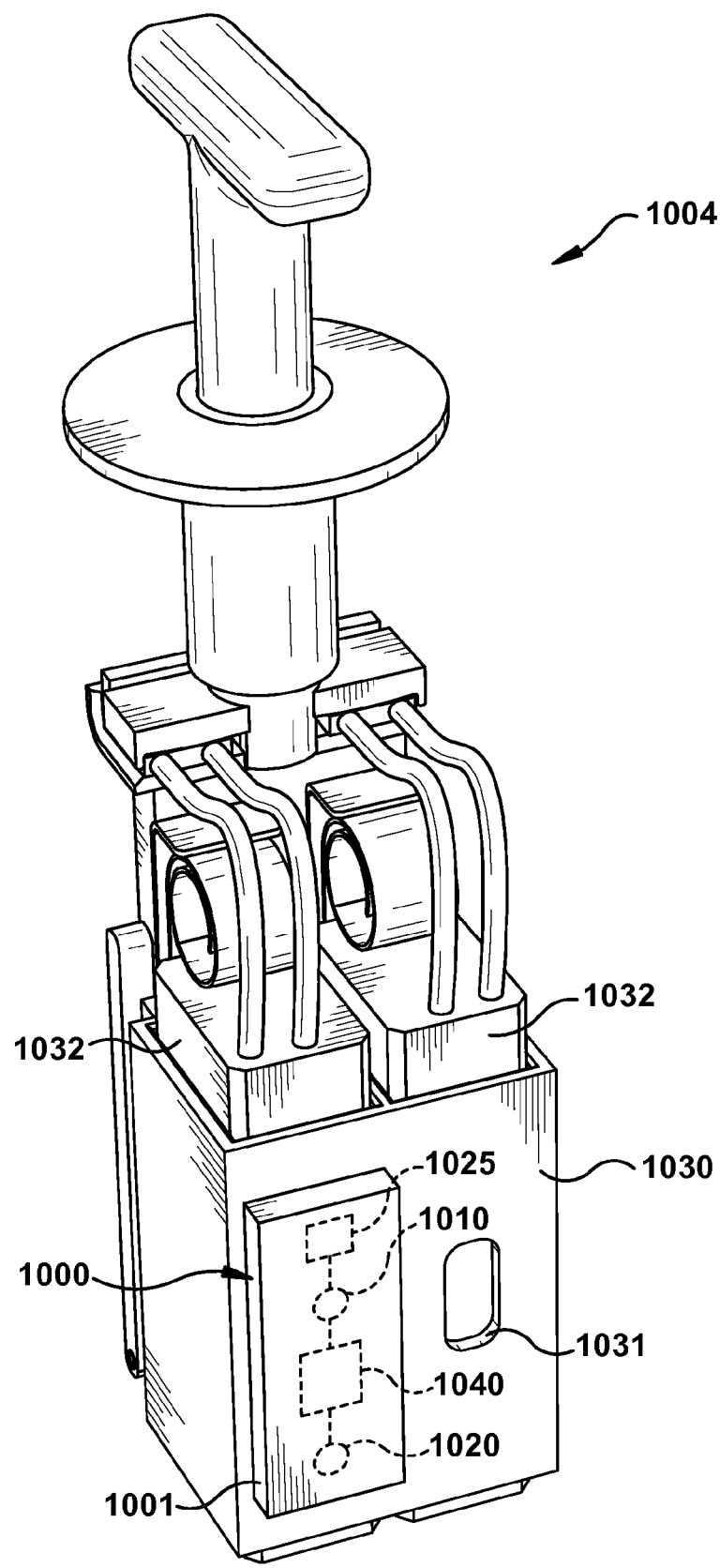
FIG. 10 illustrates a perspective view of a brush holder incorporating an RFID tag for sensing brush wear, according to an aspect of the present invention.

FIG. 10 illustrates a perspective view of a brush holder, according to an aspect of the present invention. The brush retainment member 1004 includes a wireless RFID (radio frequency identification) tag 1000 mounted on (or affixed to) the brush retainment member box 1030. Separate RFID tags 1000 may be used to monitor each brush 1032 in a brush retainment member 1030 or one RFID tag 1000 (as shown in FIG. 10) may be used to monitor a single brush 1032 to give a representative feedback on the behavior of multiple brushes 1032. The RFID tag 1000 is configured to monitor brush 1032 wear and communicate brush wear status to a monitoring system. The RFID tag 1000 includes a main body 1001 that is configured for attachment to the brush box 1030. Adhesive (not shown) may be placed between the main body 1001 and the brush box 1030, to securely mount the RFID tag in the desired location. Alternatively, magnets or fasteners (e.g., bolts or screws) or hook and loop fasteners could also be used to attach the RFID tag to the brush holder. The RFID tag 1000 includes a proximity sensor 1010 configured for detecting the presence of the brush 1032 located at least partially inside the brush holder 1030. The RFID tag 1000 includes a temperature sensor 1020 configured for detecting the temperature of at least one of the brush holder 1030 and an air temperature near the brush holder 1030. The proximity sensor 1010 is located or positioned in or over viewing window 1031.

The RFID tag 1000 is configured to transmit a wireless signal that is representative of, or may be used to determine, remaining life of the brush 1032 and/or an abnormal operating condition of the brush via an excessively high or low temperature. The wireless signal is transformable into an indication of a normal or abnormal operating condition of the brush, or into an indication of the remaining life of the brushes 1032. For example, a brush temperature that is too high or too low, may indicate an abnormal operating condition of the brush, whereas a temperature within normal operating parameters may indicate a normal operating condition. A signal from proximity sensor 1010 may be transformable into an indication of the remaining life of the brush 1032, and this indication can be a binary type indication or display (e.g., GOOD or REPLACE), or it may have greater specificity (e.g., GOOD (or greater than a minimum amount of time), 5 weeks left, 4 weeks left, 3 weeks left, 2 weeks, left, etc.). It is to be understood that time increments of various quantities (e.g. years, months, weeks, days, hours, etc.) or specific brush lengths (e.g., mm, cm, etc.) may be used to determine or indicate the amount of remaining brush life as well.

Figure 11:
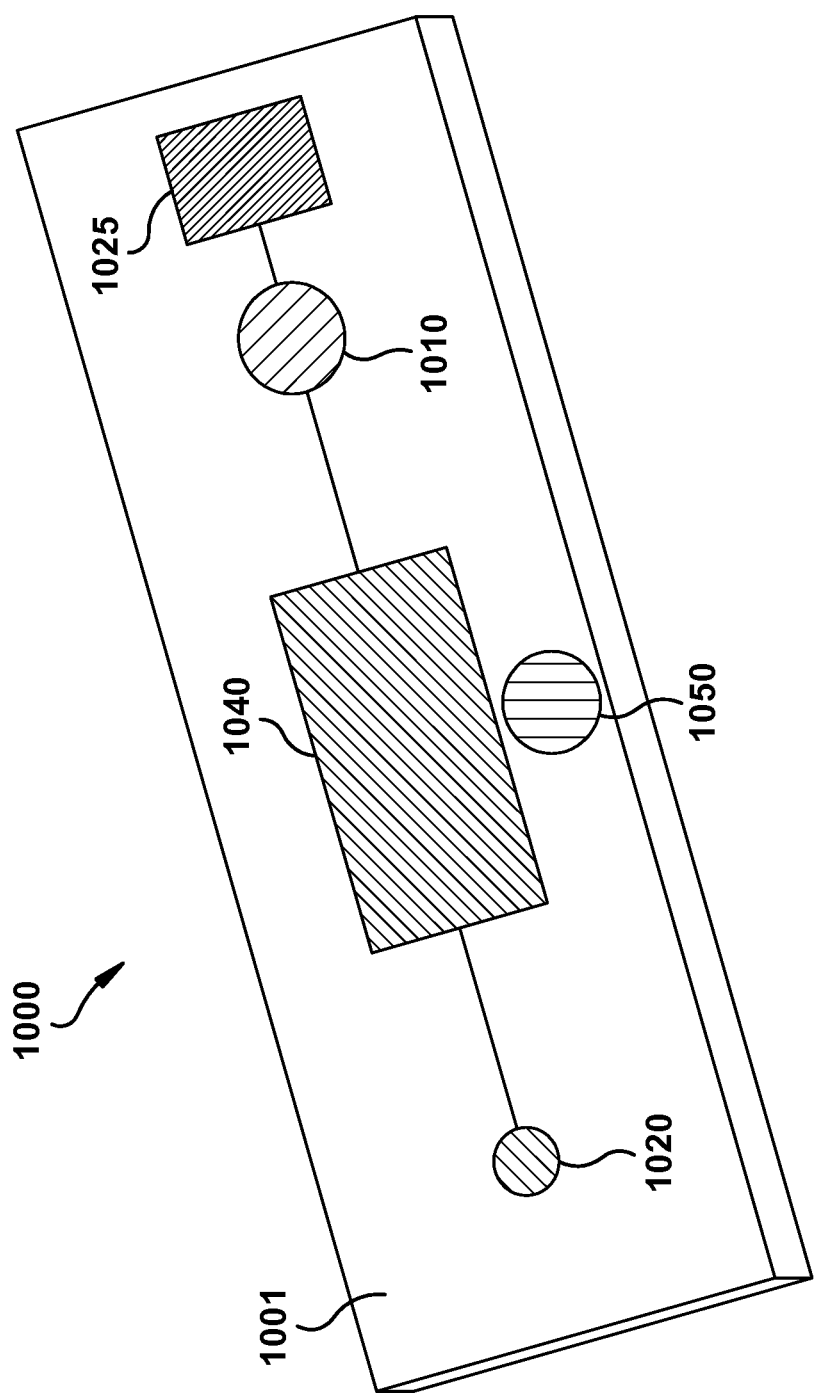
FIG. 11 illustrates a perspective view of the RFID tag of FIG. 10, according to an aspect of the present invention.

FIG. 11 illustrates a perspective view of RFID tag 1000, according to an aspect of the present invention. The RFID tag 1000 includes a proximity sensor 1010 on or in the main body 1001. The proximity sensor 1010 is configured for detecting the presence and/or position of a brush 1032 located inside the brush box 1030. The proximity sensor 1010 may be an inductor coil circuit, an electro-mechanical switch or any other suitable proximity sensing device. For example, the inductor coil circuit could be configured to provide a signal representative of a position of the brush inside the brush holder, as described hereinafter. The main body 1001 may also include a temperature sensor 1020, and the temperature sensor 1020 is configured for detecting the temperature of the brush box 1030 and/or the air temperature near the brush box 1030. The temperature sensor 1020 may be a resistor, resistance temperature sensor (RTD), thermistor, thermocouple, or any other suitable temperature sensing device.

The RFID tag 1000 is configured to transmit a wireless signal to a remote location (e.g., one or more antennas), and this wireless signal is representative of a remaining life of the brushes 1032. For example, "representative" is defined as being able to be used for determining the condition, state and/or position of the brush 1032, in brush box 1030. The condition, state or position may be a PASS (e.g., good) or FAIL (e.g., replace). Alternatively, the position of the top of the brush 1032 may be detected (by an inductor coil circuit or an electro-mechanical switch) as it passes by the proximity sensor 1010, and this changing position may be used to estimate the remaining life of the brush in a temporal period (e.g., 2 weeks of life remaining before replacement needed). Using multiple proximity sensors 1010 at different locations on the RFID tag 1000 corresponding to multiple brush lengths could be used to identify multiple stages of wear.

The RFID tag 1000 is preferably comprised of low voltage and low amperage components to reduce current consumption. This enables the RFID tag 1000 to be either fully passive (in that it receives all of its power from the interrogating signals sent by the antenna(s) 1230) or that a battery within each RFID tag 1000 will have a long life. Since the RFID tag 1000 does not harvest its energy from the current or voltage in the brush 1032, the apparatus and system 1200 can be fully operational when the dynamoelectric machine is neither energized nor in operation. The passive or active RFID tag 1000 may be configured to have low current consumption, and these low current consumption levels provide substantially improved results, because wires leading to each and every brush are no longer required. These results were unexpected because it was not anticipated that such a low power device would perform satisfactorily in a dynamoelectric machine environment, however testing has proven that accurate and reliable results have been obtained with the system and apparatus as herein described.

Figure 12:
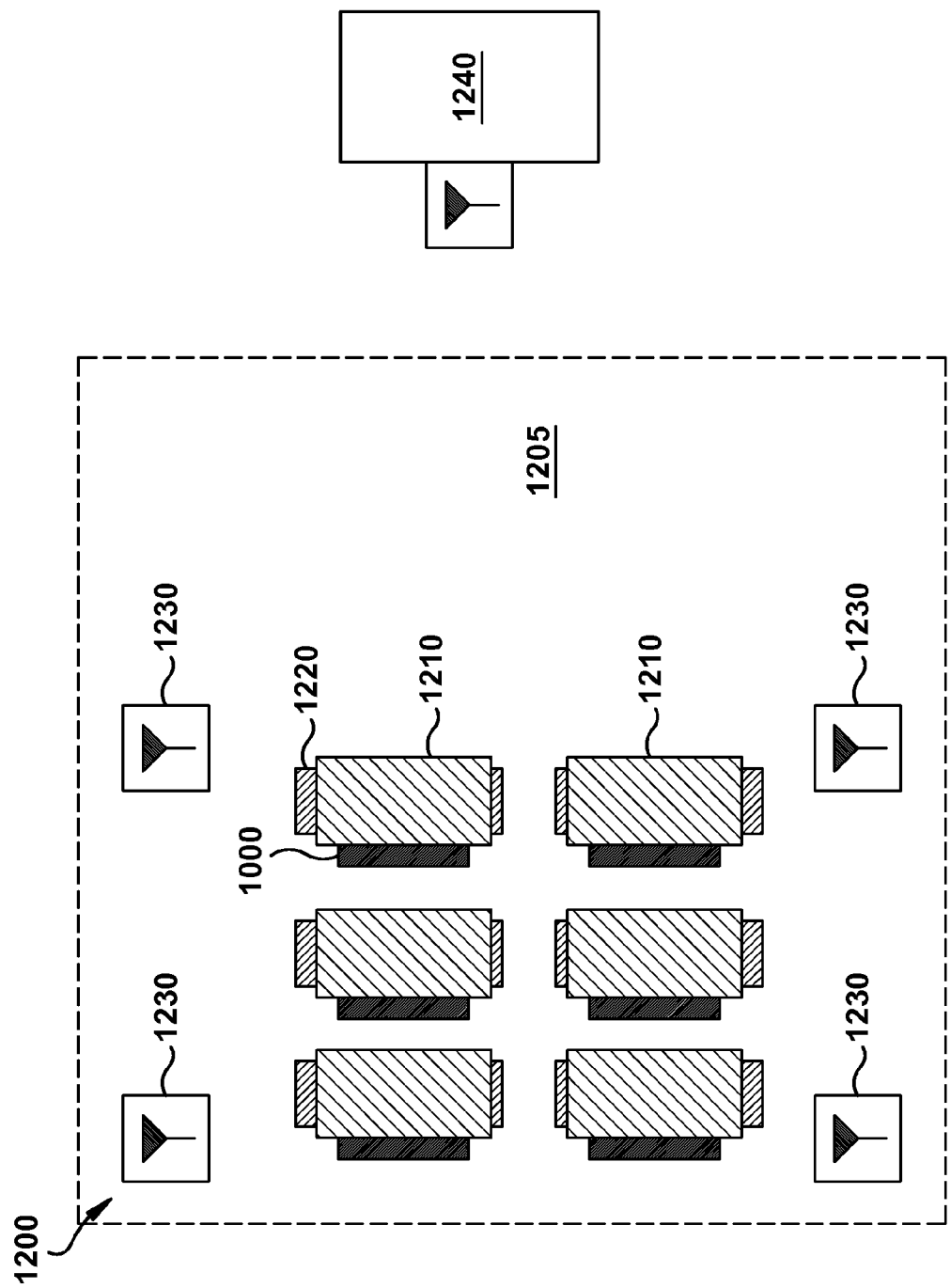
FIG. 12 illustrates a simplified schematic view of a system in a dynamoelectric machine, according to an aspect of the present invention.

The RFID tag 1000 may be configured as a radio frequency identification (RFID) device or tag, which can transmit and receive wireless signals to and/or from a receiving antenna. The RFID device may transmit in a frequency range of about 800 MHz to about 1 GHz, or about 2.4 GHz, or any other suitable frequency range. The RFID device may be configured as a passive device and receive its power from an interrogating signal, such as that received from a remotely located or nearby antenna (e.g., the one or more antennas 1230, as shown in FIG. 12). The RFID device may also be configured as an active RFID device that contains its own power source (e.g., a battery 1050) and it sends it output to the external antenna 1230, but does not need an interrogating signal, or it may be configured as a battery-assist passive RFID device where power is obtained from an internal power source and the interrogating signal comes from an external source, for example antenna 1230.

The RFID tag 1000 may include a variety of low power circuits and devices. As only one non-limiting example, the RFID tag 1000 includes a proximity sensor 1010, which may be an inductor coil, a temperature sensor 1020, an antenna 1025 and an RFID chip 1040. It is to be understood that additional or different circuits, components and IC (integrated-circuit) chips could be used to comprise the apparatus as well.

FIG. 12 illustrates a simplified schematic view of a system in a dynamoelectric machine, according to an aspect of the present invention. The system 1200 includes one or more brush holders 1210, each configured for holding one or more brushes 1220, and the brush holder 1210 is configured for use in a dynamoelectric machine 1205. For example, the dynamoelectric machine may be a generator with a rotating DC field or a rotating AC armature, or a motor. An RFID tag 1000 is attached to the brush holder 1210, and the RFID tag 1000 includes one or more proximity sensors configured for detecting the presence of the brush 1220 located at least partially inside the brush holder 1210. The RFID tag 1000 may also include a temperature sensor configured for detecting the temperature of the brush holder 1210 and/or an air temperature near the brush holder 1210. The RFID tag 1000 is configured to transmit a wireless signal to one or more antennas 1230 disposed within or near the dynamoelectric machine 1205, where the one or more antennas 1230 are configured to receive the wireless signal from (and in some embodiments, transmit energy to) the RFID tag 1000. The wireless signal is representative of, or may be used for determining, a remaining life of the brush 1220. As each RFID tag 1000 may be assigned a unique identification code, it is possible to identify the state or condition of each brush 1220.

The system 1200 may transmit data to a local or remotely located monitoring station or system 1240. A technician can view the received data (from the wireless signals) and monitor the state or condition of each brush in the dynamoelectric machine 1205. The data regarding each brush may be displayed in graphical or tabular form, and could be transformed into an indication of the remaining life of each brush or the amount of time until the brush fails or the amount of time until replacement is needed.

The apparatus, brush holder and system are configured to monitor a variety of conditions of the brush and/or brush holder using sensor types including: temperature, electromagnetic, pressure, strain, acceleration, resistance, electromechanical, magneto resistive, hall effect, current measurement and/or other suitable devices. The apparatus and sensor (s) can be located on (in physical contact with) and/or proximate to, a brush holder, for assessing the general condition of the brush/commutator apparatus of the dynamoelectric machine. In one particular embodiment, brush position and/or temperature measurements provide a mechanism for determining whether and when to perform brush replacement or adjustment.

One advantage provided by the present invention, is that the RFID tag 1000 can be added to an existing brush holder, so that the brush itself does not have to be modified. As the brush is a "consumable item, this provides an economic advantage to the user, because they can purchase, use and replace standard brushes for low cost. The apparatus and system herein described also avoids the use of extra wires attached to the brush holder or brush itself. The "extra wires" approach has potential for additional shorting paths and excessively noisy signals from the adjacent energized components. It also interferes with visual inspection and the brush changing operation. The present invention also provides the advantage of eliminating sensors physically attached or embedded within the brush. This reduces cost and eliminates the possibility that the brush will be adversely affected when sliding along the brush holder, as any attachment onto the brush presents the possibility for the brush to get stuck in the brush holder. If a brush gets stuck and stops sliding down the brush holder, a gap will form between the brush and collector, and this could lead to undesired arcing and eventual machine failures. It can also be fully operational when the rest of the dynamoelectric machine is not in operation.

The brush holder, apparatus and system according to the aspects of the present invention, may be used with, or applied to, any dynamoelectric machine. As non-limiting examples only, dynamoelectric machines may include motors and generators with either a rotating dc field or a rotating ac armature. The brush holder, apparatus and system of the present invention demonstrates substantially improved results, that were unexpected, because a brush holder is now provided that enables one-handed insertion and removal without the use of any tools, and insulates and protects a user's hand from contact with live (electrically energized) brush leads on operating dynamoelectric machines.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A brush holder system comprising:
a stationary support member having at least one groove, the stationary support member having a fork electrical connector;
a brush retainment member configured to be releasably affixed to the stationary support member, the brush retainment member having at least one rail configured to slide along the at least one groove, the brush retainment member having a knife electrical connector configured to mate with the fork electrical connector;
a radio frequency identification device (RFID) tag mounted on the brush retainment member, the RFID tag configured to monitor brush wear and communicate brush wear status to a monitoring system, the RFID tag having a proximity sensor configured for detecting the presence of at least one brush located at least partially inside the brush retainment member, and wherein the RFID tag is configured to transmit a wireless signal;
one or more antennas disposed within or near a dynamoelectric machine, the one or more antennas configured to receive the wireless signal from the RFID tag; and
wherein the wireless signal is transformable into an indication of a remaining life of the at least one brush, and wherein the stationary support member is configured for electrical connection to a collector mount and the brush retainment member is configured to retain the at least one brush.

2. The system of claim 1, the RFID tag further comprising:
a temperature sensor configured for detecting a temperature of at least one of the brush retainment member and air near the brush retainment member; and
wherein the wireless signal is transformable into an indication of a normal or abnormal operating condition of the at least one brush.

3. The system of claim 2, the RFID tag further comprising:
an active radio frequency identification (RFID) device configured to transmit the wireless signal to one or more antennas, and wherein the active radio frequency identification (RFID) device is configured to receive its power from a battery.

4. The system of claim 1, the proximity sensor comprising at least one of:
an inductor coil circuit and an electro-mechanical switch.

5. The system of claim 1, wherein the RFID tag transmits in a frequency range of about 800 MHz to about 1 GHz, or about 2.4 GHz.

6. The system of claim 1, wherein the brush retainment member further comprises:
at least one cam member operably connected to a shaft near a bottom of the brush retainment member, the cam member configured to retain a brush from sliding within the brush retainment member by pressing it against the brush retainment member until the brush retainment member is fully inserted in the stationary support member.

7. The system of claim 6, wherein the stationary support member further comprises:
a bar located near a bottom end of the stationary support member, the bar configured to engage and restrain the at least one cam member so that the brush is free to move and contact a collector of a dynamoelectric machine once the brush retainment member is substantially fully inserted into the stationary support member.

8. The system of claim 7, wherein the stationary support member further comprises:
a tapered slot configured for cooperation with a locking pin on the brush retainment member.

9. The system of claim 7, wherein the stationary support member further comprises:
a plurality of holes configured to facilitate attachment of the stationary support member to the collector mount; and
wherein the plurality of holes are configured to attach a plurality of stationary support members together.

10. The system of claim 7, wherein at least one of the stationary support member and the brush retainment member is comprised of aluminum or an aluminum alloy.

11. The system of claim 7, wherein at least one of the stationary support member and the brush retainment member is comprised of a passivated or anodized aluminum or a passivated or anodized aluminum alloy, and wherein at least a portion of a surface of at least one of the stationary support member and the brush retainment member is configured to be substantially electrically insulating.

12. The system of claim 7, wherein at least one of the stationary support member and the brush retainment member is comprised of a powder coated or painted aluminum, a powder coated or painted aluminum alloy, a ceramic coated metallic or ceramic coated non-metallic material, and wherein at least a portion of a surface of at least one of the stationary support member and the brush retainment member is configured to be substantially electrically insulating.

13. The system of claim 7, the brush retainment member further comprising:
a handle assembly comprising an electrically insulating handle having an electrically insulating guard configured to be located between the handle and brush connector leads, the handle assembly including a locking pin configured for cooperation with a tapered slot in the stationary support member; and
wherein the handle assembly is configured for rotation so that the locking pin may be rotated into and out of the tapered slot.

14. The system of claim 13, wherein the handle assembly is configured to be rotated about 90 degrees, a 0 degree position configured so that the locking pin is disengaged from the tapered slot so that the brush retainment member may be removed from the stationary support member, and a 90 degree position configured so that the locking pin is engaged in the tapered slot so that the brush retainment member is fully locked into operating condition on the stationary support member.

15. The system of claim 13, the handle assembly further comprising:
a spring assembly mechanically connected to a brush terminal compression plate, the spring assembly configured to apply pressure to one or more brush terminals at least until the electrically insulating handle is in a locked position.

16. The system of claim 7, wherein the brush retainment member is configured to accept a single brush or a plurality of brushes.

17. The system of claim 7, wherein the brush retainment member is configured to clamp a brush terminal between a terminal compression plate and an opposing surface of the brush retainment member, and wherein the brush terminal is manually engaged.

18. The system of claim 17, wherein the brush terminal includes at least one of:
a bend, a rib, a hole or a notch; a protrusion and
wherein the brush retainment member includes a complementary feature to the bend, the rib, the hole, the protrusion or the notch to facilitate securing the brush terminal to the brush retainment member.

19. The system of claim 7, wherein the brush retainment member is configured to electrically and mechanically connect the knife electrical connector to a brush terminal; and
wherein the knife electrical connector and the brush terminal are electrically insulated from a handle of the brush retainment member.

* * * * *